Nov. 9, 1971    J. L. CHERPES    3,618,413
VARIABLE SPEED TRANSMISSION
Filed April 6, 1970    2 Sheets-Sheet 1
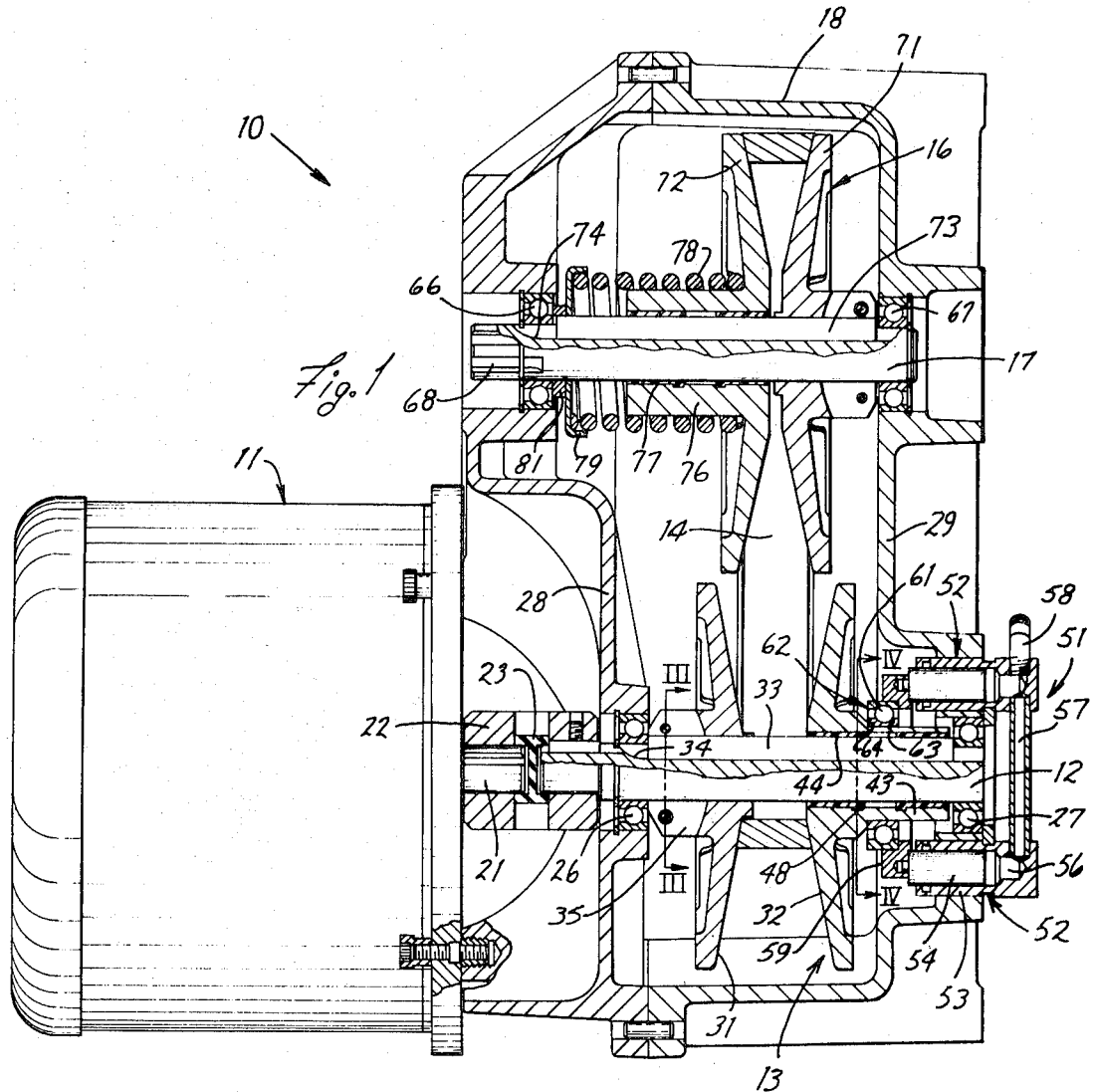
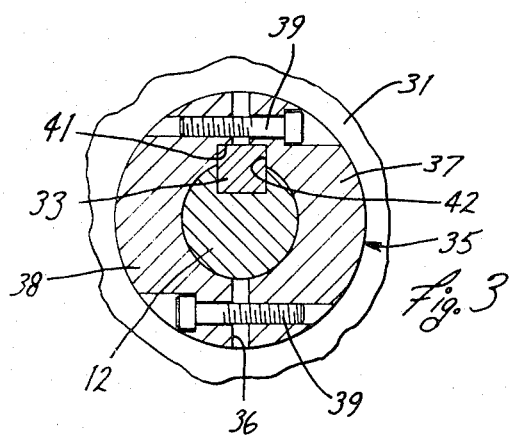
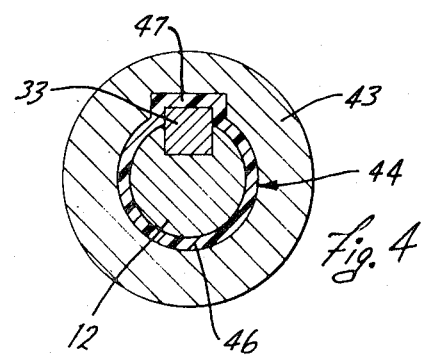
INVENTOR.
JAMES L. CHERPES
BY
Woodhams, Blanchard & Flynn
ATTORNEYS

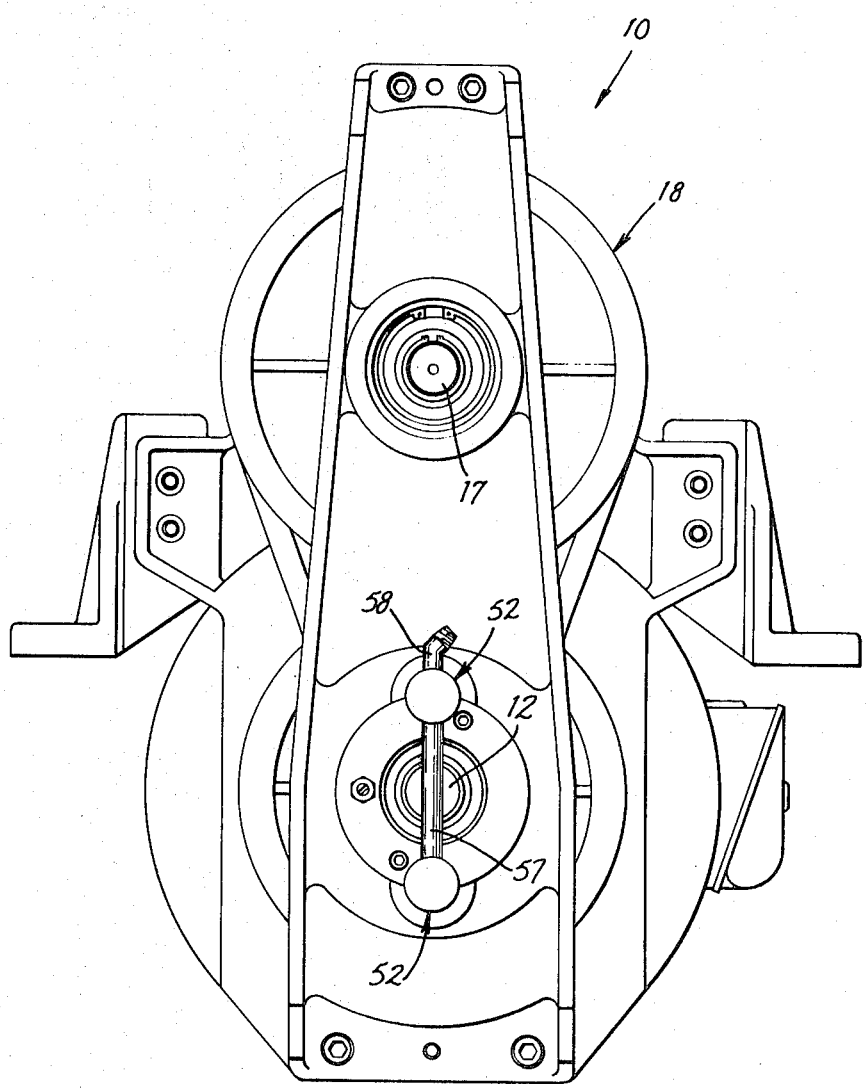

United States Patent Office 3,618,413
Patented Nov. 9, 1971

3,618,413
VARIABLE SPEED TRANSMISSION
James L. Cherpes, Kalamazoo, Mich., assignor to
Clausing Corporation, Kalamazoo, Mich.
Filed Apr. 6, 1970, Ser. No. 25,892
Int. Cl. F16h 55/22
U.S. Cl. 74—230.17 A                      11 Claims

ABSTRACT OF THE DISCLOSURE

A variable speed transmission having an input shaft coaxially aligned with a driving motor and supported adjacent its opposite ends by antifriction bearings. The input shaft has an adjustable pulley assembly nonrotatably secured thereto, which pulley assembly includes a fixed pulley half secured to the shaft and a movable pulley half slideably mounted on the shaft for rotation therewith and for movement toward and away from the fixed pulley half. The movable pulley half is connected to a suitable actuator for adjustably axially moving same. The fixed pulley half has a split hub which clampingly engages both the shaft and a driving key for providing additional support for said key. The driving key extends the full length of both pulley halves to further stabilize the assembly and minimize hammering between the moveable pulley half and the key upon starting, stopping or reversing of the drive means. The adjustable pulley assembly drives a belt which drives a spring-tensioned pulley assembly mounted on an output shaft. The driving and driven pulley assemblies and the input and output shafts are preferably constructed of aluminum to minimize inertia.

FIELD OF THE INVENTION

This invention relates to a variable speed transmission and, specifically, relates to a pulley-type infinitely variable speed transmission having a constant horsepower output throughout the entire speed range, same thus being particularly suitable for use with machine tools wherein the transmission is subjected to rapid or sudden starts, stops and reversals in rotational motion.

BACKGROUND OF THE INVENTION

The art of pulley-type variable speed transmissions is highly developed. However, even in this highly developed state, variable speed transmissions continue to create considerable operational and maintenance problems, particularly when such variable speed transmissions are utilized on machine tools, such as on drill presses, lathes or milling machines.

When variable speed transmissions are used on machine tools, they must be capable of transmitting a constant horsepower throughout the entire speed range and at the same time the transmission must be capable of starting, stopping and/or reversing rapidly and repetitively in order to permit the machine tool to be utilized to its maximum capability and efficiency.

While known variable speed transmissions have operated in an acceptable manner, nevertheless they have possessed structural and operational features which are undesirable and thus prevents maximum utilization of the machine tool. Particularly, one of the disadvantages associated with the known devices is the hammering which occurs between the pulleys and the associated keys during rapid rotational motion reversals and upon starting and stopping. The known devices have generally provided a small clearance between the shaft key and the moveable pulley due to manufacturing and assembly tolerances. Accordingly, when a rapid start, stop or reversal of motion occurs, the rotational inertia of the pulley and shaft causes a relative rotation between the pulley and the shaft key. This hammering is undesirable not only because of the noise produced, but also because it imposes undue impact forces and stresses on the key and the pulley, thereby resulting in premature failure.

A further disadvantage of many known variable speed transmissions has been the inability to provide adequate support bearings adjacent opposite ends of the input shaft. For example, certain of the known variable speed transmissions have utilized a conventional adjustable pulley mounted on the input shaft, one-half of the pulley being axially adjustable by means of an actuator which is mounted in a cantilever manner and surrounding one end of the shaft. The actuator thus normally prevents the end of the shaft from being adequately supported, whereupon the input shaft is thus supported entirely in a cantilever manner. The pulley thus imposes undesirable loads and deflections on the input shaft, which loads and deflections must then be compensated for by enlarging the overall assembly.

Still a further problem associated with the known mechanical variable speed transmissions has been their inability to rapidly start or stop in the desired short time interval. Most of the known variable speed transmissions have utilized shafts and pulleys made of ferrous materials whereby the shafts and pulleys thus have relatively large masses and inertias. The large inertia of the shaft and pulley combination thus makes rapid starting and stopping difficult, and thus introduces a design problem which it is desirable to reduce. Further, the large inertia of the pulley and the shaft also increases the hammering that occurs between the pulley and the key during starting and stopping, which still further increases the tendency toward early failure.

Another problem associated with the known variable speed transmissions has been the inability to provide a key-type mounting structure for securing the movable pulley half to the shaft without causing unacceptable wear, fretting or sticking due to the axial sliding movement of the pulley half on the shaft.

Accordingly, it is an object of the present invention to provide an improved pulley-type variable speed transmission which overcomes the above-mentioned disadvantages. Specifically, it is an object of the present invention:

(1) To provide an improved variable speed transmission which is particularly suitable for use on machine tools with the transmission being able to respond to the rapid starts and stops and/or the rapid reversals in rotation encountered during normal operation of the machine tool;

(2) To provide a transmission, as aforesaid, which provides adequate bearing support at both ends of the input shaft while also enabling the actuator for the movable pulley half to be positioned in surrounding relationship on one end of the input shaft;

(3) To provide a transmission, as aforesaid, which permits free sliding movement of the movable pulley half on the input shaft without causing unacceptable wear or fretting;

(4) To provide a transmission, as aforesaid, which provides a shaft without the necessity of providing separate lubrication for the parts;

(5) To provide a transmission, as aforesaid, wherein the free sliding movement of the movable pulley half is accomplished by providing a single, elongated continuous key fixedly secured to the shaft and extending through both the movable pulley half and the stationary pulley half;

(6) To provide a transmission, as aforesaid, wherein the deterious effects resulting from the hammering which occurs between the shaft key and the moveable pulley half during rapid starting and stopping are substantially minimized;

(7) To provide a transmission, as aforesaid, wherein the hammering between the key and the fixed pulley half is eliminated by providing the fixed pulley half with a split clamping hub, which hub tightly clampingly engages each side of the key to eliminate any clearance therebetween;

(8) To provide a transmission, as aforesaid, wherein the inertia of the transmission is substantially minimized to enable the transmission to be rapidly started, stopped, and/or the rotational motion reversed;

(9) To provide a transmission, as aforesaid, wherein the transmission inertia is minimized by so designing the components thereof that they are capable of being manufactured from aluminum;

(10) To provide a transmission, as aforesaid, wherein an actuator is provided for the movable pulley half, which actuator includes a pair of diametrically opposed cylinder means surrounding one end of the pulley shaft and providing a suitable bearing for supporting the end of the shaft; and

(11) To provide a transmission, as aforesaid, which is economical and relatively inexpensive to manufacture and assemble, which is relatively free of maintenance and which has a long operational life.

Other objects and purposes of the invention will be apparent to persons acquainted with devices of this type upon reading the following specification and inspecting the accompanying drawings.

BRIEF DESCRIPTION OF THE DRAWINGS

FIG. 1 is a partial sectional view on a variable speed transmission constructed in accordance with the present invention.

FIG. 2 is an end elevational view as appearing from the right side of FIG. 1.

FIG. 3 is a sectional view taken along the line III—III of FIG. 1.

FIG. 4 is a sectional view taken along the line IV—IV of FIG. 1.

Certain terminology will be used in the following description for convenience and reference only and will not be limiting. The words "upwardly," "downwardly," "rightwardly" and "leftwardly" will designate directions in the drawings to which reference is made. The words "inwardly" and "outwardly" will refer to the directions toward and away from, respectively, the geometric center of the device and designated parts thereof. Said terminology will include the words above specifically mentioned, derivatives thereof and words of similar import.

SUMMARY OF THE INVENTION

The objects and purposes of the invention are met by providing a variable speed transmission having an input shaft coaxially aligned with and drivingly connected to the motor shaft, the input shaft being provided with an adjustable pulley assembly thereon drivingly connected to a spring-tensioned pulley assembly provided on an output shaft positioned substantially parallel to the input shaft. The input and output shafts are mounted within a housing and are each provided with suitable support bearings adjacent opposite ends of each thereof. The adjustable pulley assembly and the spring-tensioned pulley assembly are each provided with a stationary half and an axially slidable half, the two halves of each pulley assembly being nonrotatably connected to its respective shaft by means of a continuous elongated key. Each stationary pulley half is provided with a split hub which is clampingly engaged with the sides of the key and with the shaft to prevent hammering between the fixed pulley half and the shaft during starts, stops and reversals. An actuator device, which preferably includes a pair of diametrically opposite fluid pressure cylinders, is positioned adjacent the end of the shaft opposite the motor for causing controllable axial shifting of the movable half of the adjustable pulley assembly. Suitable low-friction bushings, of self-lubricating material, are mounted within the movable pulley half and disposed in surrounding relationship to the shaft and its associated key for completely enclosing same, thereby facilitating free axial sliding of the movable pulley half. The shafts and the pulley assemblies are preferably constructed of aluminum to minimize the rotational inertia of the transmission to permit rapid starting, stopping and/or reversal.

DETAILED DESCRIPTION

FIG. 1 illustrates therein a variable speed transmission 10 constructed in accordance with the present invention. The transmission 10 includes a motor 11 drivingly connected to an input shaft 12, which shaft is provided with an adjustable pulley assembly 13 thereon. The adjustable pulley assembly 13 drivingly engages a belt 14, which belt in turn is drivingly engaged with the driven spring-tensioned pulley assembly 16. The driven pulley assembly 16 is drivingly connected to an output shaft 17 which is substantially parallel with the input shaft 12, the shafts 12 and 17 each being supported within a suitable housing 18.

Considering now the specific structural details of the transmission 10, the motor 11 is provided with a driving shaft 21 which is coaxially aligned with and drivingly coupled to the input shaft 12 by means of a sleeve coupling 22. A suitable resilient spacer 23 is disposed within the sleeve coupling 22 between the adjacent ends of the motor shaft 21 and the input shaft 12. The input shaft 12 is supported adjacent its opposite ends by conventional antifriction bearings 26 and 27, which bearings are mounted within the spaced housing walls 28 and 29, respectively.

The adjustable pulley assembly 13 is nonrotatably mounted on the input shaft 12 and specifically includes a stationary pulley half 31 fixedly connected to the input shaft 12 and a movable pulley half 32 nonrotatably mounted on the shaft 12 but mounted for axial sliding movement relative thereto. The shaft 12 is provided with an elongated groove or spline 34 in which is fixedly positioned a rectangular key 33, which key extends through both and fixed pulley half 31 and the movable pulley half 32 for nonrotatably securing same to the input shaft 12.

The fixed pulley half 31 includes an axially extending cylindrical hub 35 which contains a diametrical slot 36 (FIG. 3) extending therethrough, which slot 36 splits the cylindrical hub into two substantially semicylindrical hub portions 37 and 38 (FIG. 3). The fixed pulley section 31 is secured to the shaft 12 by means of screws 39 extending between the hub portions 37 and 38, which screws cause the hub portions 37 and 38 to be contracted into clamping engagement with the shaft 12. The cylindrical hub 35 has a notch 41 extending axially therethrough, which notch 41 is aligned with and comprises a portion of the slot 36. The notch 41 in the region of the diametrical slot 36 defines opposite substantially radial walls 42 which are adapted to contact the corresponding sidewalls of the key 33 when the fixed pulley half 31 is positioned in surrounding relationship to the shaft 12, whereby tightening the screws 39 causes the hub portions 37 and 38 to clamp not only the shaft but also the sidewalls of the key, whereupon the key is thus fixedly positioned relative to both the shaft 12 and the pulley assembly 13.

The movable pulley half 32 also includes a cylindrical hub portion 43 positioned in surrounding relationship to shaft 12 and key 33. The hub portion 43 is provided with a pair of identical, axially spaced bushings 44 therein, which bushings completely encircle the shaft 12 and the key 33 (FIG. 4) for permitting free sliding movement of the pulley half 32 relative to the shaft 12. The bushings 44 each include an annular portion 46 fixedly, here integrally, connected to a channel-shaped portion 47, which channel-shaped portion completely extends around and encloses the key 33 as illustrated in FIG. 4.

The bushings 44 are each additionally provided with an annular locking flange 48 adjacent one end thereof, which flange is adapted to be snapped into a small groove formed within the inner periphery of the cylindrical hub 43 for axially securing the bushing relative to the hub. The bushings 44 are preferably constructed of a suitable low-friction, self-lubricating, nonmetallic material so as to substantially eliminate galling and fretting between the pulley and the key. One preferred material for the bushing is a Delrin filled with Teflon fibers, such as Delrin type AF.

The axial movement of the pulley half 32 is controlled by means of an actuator device 51 positioned adjacent the pulley half 32 in surrounding relationship to the adjacent end of the input shaft 12. The actuator device 51 in the illustrated embodiment includes a plurality of equally spaced fluid pressure cylinders, here a pair of diametrically spaced cylinders 52, each of which includes a stationary cylinder 53 fixedly positioned and mounted within the housing wall 29. Each cylinder 53 has a slidable piston 54 therein, the cylinders 53 each having a fluid inlet opening 56 for supplying pressurized fluid into the cylinder for causing movement of the pistons 54. The fluid inlet openings 56 are interconnected by an intermediate conduit 57, which is also connected to a supply line 58. Supply line 58 is connected to a suitable source (not shown) of pressurized hydraulic fluid for permitting selective actuation and axial movement of the pulley half 32.

The movable pistons 54 are fixedly connected to an annular actuator ring 59 which surrounds the shaft 12 and is engaged with the outer race 61 of the antifriction ball bearing assembly 62. The ball bearing assembly 62 further includes an inner race 63 which is nonrotatably supported upon the cylindrical hub portion 43 of the pulley half 32 and suitably bears against a shoulder 64 formed thereon.

Considering now the output shaft 17, same is also supported on the housing means 18 by conventional antifriction bearing means 66 and 67, which bearing means are disposed adjacent opposite ends of the shaft 17 and are supported within the opposite housing walls 28 and 29. The shaft 17 is provided with a splined end portion 68 which is adapted to be drivingly connected to a suitable driven device.

The output shaft 17 has the driven pulley assembly 16 nonrotatably mounted thereon, which pulley assembly also includes a fixed pulley half 71 and a movable pulley half 72. The pulley assembly 16 is nonrotatably interconnected to the output shaft 17 by means of a single elongated key 73 extending longitudinally through both pulley halves 71 and 72, the key 73 being fixedly positioned within a groove 74 which extends axially of the shaft 17.

The pulley half 71 is fixed to the output shaft 17, both axially and circumferentially, and is identical to the fixed pulley half 31 as described below in that it includes a split cylindrical hub which is used for moving the fixed pulley half 71 into clamping engagement with both the shaft 17 and the key 73.

The movable pulley half 72 is nonrotatably secured to the shaft 17 by means of the key 73 but is mounted for axial sliding movement relative to the shaft. The movable pulley half 72 is similar to the movable pulley half 32 described below in that it includes an axially extending cylindrical hub portion 76, which hub portion has a pair of axially spaced bushings 77 fixedly secured thereto and disposed in concentric and sliding engagement with the key 73 and the output shaft 17. The bushings 77 are identical to the bushings 44 described above and thus no further description thereof is believed necessary.

The movable pulley half 72 is normally resiliently urged axially toward the fixed pulley half 71 by means of a coil spring 78, which coil spring surrounds the cylindrical hub portion 76 and bears against the movable pulley half 72. The other end of the coil spring 78 bears against and is confined within a cup-shaped retainer member 79, which member 79 surrounds and is slidably received on the output shaft 17. The retainer member 79 in turn bears against a thrust washer 81 positioned in abutting engagement with the inner race of the antifriction bearing assembly 66.

The input shaft 12, the output shaft 17, the halves 31 and 32 of the driving pulley assembly 13, and the halves 71 and 72 of the driven pulley assembly 16 are all preferably constructed of aluminum so as to minimize both the inertia and weight of the transmission assembly. Further, the keys 33 and 73 are preferably constructed of stainless steel since such keys can be manufactured more economically than conventional chromium-plated steel keys. The aluminum shafts 12 and 17 are preferably given a special hard surface coating by an anodized process so as to increase the wear resistance thereof. Use of such aluminum shafts and pulleys, in addition to minimizing the transmission weight and inertia, also results in more rapid heat dissipation, which thus results in the overall transmission assembly running at a much cooler temperature during operation.

OPERATION

The operation of the device embodying the invention will be described in detail hereinbelow for a better understanding thereof.

As is well understood, energization of motor 11 causes rotation of input shaft 12 and the adjustable pulley assembly 13, which by means of the intermediate belt 14 drives the spring-tensioned pulley assembly 16 for causing a corresponding rotation of the output shaft 17. The speed ratio between the input shaft 12 and the output shaft 17 depends upon the relative axial positions of the pulley halves 31 and 32 which, as illustrated in FIG. 1, are axially spaced a maximum distance apart so that the driving belt 14, which is in frictional engagement with the inner tapered surfaces of the pulley halves 31 and 32, is disposed inwardly in engagement at the smallest effective radial dimension. When the movable half 32 is moved to its outermost axial position so as to position the belt 14 at its radially inwardmost position, substantial slack is created in the belt 14, which slack permits the spring 78 to move the driven pulley half 72 axially toward the fixed pulley half 71, which inward axial movement causes the slack to be removed from the belt 14 whereby the belt 14 engages the driven pulley assembly 16 at the maximum effective diameter thereof. The relationship illustrated in FIG. 1 thus results in a maximum speed reduction between the input and output shafts.

When it is desired to minimize or reduce the speed reduction between the input and output shafts, pressurized fluid is supplied through line 58 and through intermediate conduit 57 into the cylinders 54, which pressurized fluid causes the pistons 54 and the actuator ring 59 to move axially inwardly (leftwardly in FIG. 1), which in turn causes the movable pulley half 32 to move axially inwardly toward the fixed pulley half 31. This axial movement of the movable pulley half 32 causes the belt 14 to be moved radially outwardly relative to the shaft 12, which in turn causes the belt 14 to be moved radially inwardly relative to the shaft 17. The radial inward movement of the belt 14 relative to the shaft 17 causes the movable pulley half 72 to be moved axially outwardly away from the fixed pulley half 71 in opposition to the urging of spring 78. In this manner, the effective diameter of the driving pulley assembly 13 is increased and the effective diameter of the driven pulley assembly 16 is decreased, thus reducing the speed reduction between the input shaft 12 and the output shaft 17. Inasmuch as the input shaft 12 is supported by the bearing assemblies 26 and 27 adjacent its opposite ends, the shaft 12 is not subjected to a cantilever-type loading, whereby the bearings are subjected to minimum load and thus have a long operational life without requiring more than minimum maintenance.

Further, the transmission assembly 10 can be rapidly and easily started or stopped since the pulley assemblies 13 and 16 and the shafts 12 and 17 are all constructed of aluminum. The rotational inertia of the overall system is thus maintained at a minimum, whereby the angular acceleration or deceleration of the system can be substantially increased so as to permit the transmission to be started or stopped in an extremely short time interval. Further, starting and stopping of the transmission assembly, or a reversal in the direction or rotation thereof, can be accomplished without causing any hammering between the pulley assemblies and the associated keys since the fixed pulley halves clampingly engage both the shaft and the key due to the split hub construction, thereby entirely eliminating effective clearance therebetween.

Further, the use of continuous elongated keys 33 and 73 for extending through both the fixed and movable pulley halves substantially prevents any cocking of the key or of the pulley relative to the shaft, which thus not only minimizes wear; but also minimizes the unit pressure between the pulley and the shaft, particularly between the key and the shaft. Further, the use of a single key also facilitates the sliding movement of the movable pulley half, which free sliding movement is further facilitated by the use of the sleeve bearings 44 and 74, which bearings completely surround and encase both the shaft and the key such that there is no metal-to-metal sliding surface engagement between the movable pulley half and the corresponding shaft.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A variable speed transmission assembly, comprising:
    housing means,
    motor means including a driving shaft;
    input shaft means drivingly connected to said driving shaft;
    bearing means mounted on said housing means and rotatably supporting said input shaft means at least adjacent the end thereof opposite said motor means;
    output shaft means rotatably supported on said housing means in spaced relationship with said input shaft means;
    variable speed transmission means drivingly interconnected between said input shaft means and said output shaft means, said transmission means including an adjustable pulley assembly nonrotatably mounted on one of said shaft means and a further pulley assembly nonrotatably mounted on said other shaft means means and belt means drivingly connected therebetween;
    said adjustable pulley assembly including a first pulley section fixedly connected to said one shaft means and a second pulley section slideably mounted on said one shaft means for axial movement relative thereto toward and away from said first pulley section;
    a continuous elongated key member extending axially of and fixedly secured to said one shaft means, said key member extending through both said first and second pulley sections for nonrotatably securing same to said one shaft means;
    bushing means of low-friction, self-lubricating material disposed between said one shaft means and said second pulley section for providing the sole slidable support for said second pulley section as it slides axially relative to said one shaft means; and
    actuator means interconnected to said second pulley section for causing same to move axially relative to said first pulley section for varying the speed ratio of said transmission means.

2. A transmission assembly according to claim 1, wherein said first pulley section includes an axially elongated cylindrical hub portion disposed in surrounding relationship to said one shaft means with said hub portion having a notch extending axially therethrough for receiving said key member therein, said cylindrical hub portion being provided with a diametrically extending slot formed therein and extending over a portion of the axial length thereof, said slot extending through the notch and dividing said hub portion into two opposed hub sections, and means fixedly interconnecting said hub sections for causing same to clampingly engage both said one shaft means and the opposite lateral sides of said key member.

3. A transmission assembly according to claim 2, wherein at least said one shaft means and said first and second pulley sections are constructed of aluminum.

4. A transmission assembly according to claim 3, wherein said bushing means includes a sleeve-like bushing member having an annular portion completely surrounding the exposed peripheral portion of said one shaft means, said bushing member further having a channel-shaped portion afixedly secured to said annular portion and completely surrounding the exposed periphery of said key member.

5. A transmission assembly according to claim 1, wherein the input shaft means, the adjustable pulley assembly and the further pulley assembly are all constructed of aluminum.

6. A transmission assembly according to claim 1, wherein said actuator means includes a plurality of fluid pressure cylinder means equally spaced around said one shaft means, said fluid pressure cylinder means each having a movable piston drivingly interconnected to said second pulley section for moving same axially toward said first pulley section.

7. A transmission assembly according to claim 1, wherein antifriction bearing means are mounted on said housing means for rotatably supporting the opposite ends of said input shaft means and the opposite ends of said output shaft means, and said further pulley assembly including a third pulley section fixedly secured to said other shaft means and a fourth pulley section mounted on said other shaft means for slidable axial movement relative thereto toward and away from said third pulley section and a continuous elongated key member fixedly secured to said other shaft means and extending through said third and fourth pulley sections for nonrotatably securing same to said other shaft means, and spring means coacting between said housing means and said fourth pulley section for normally urging same axially toward said third pulley section.

8. A transmission assembly according to claim 7, wherein a sleeve-like bushing is fixedly secured to each of said second and fourth pulley sections and is disposed in surrounding relationship to the respective shaft means and key member for completely surrounding same.

9. A transmission assembly according to claim 8, wherein said input shaft means, said adjustable pulley assembly, and said further pulley assembly are all constructed of aluminum.

10. A transmission assembly according to claim 1, wherein said actuator means includes a pair of fluid pressure cylinder means positioned on diametrical opposite sides of said one shaft means, each of said cylinder means including a stationary cylinder fixedly mounted on said housing means and a piston slidably disposed within said cylinder, the pair of cylinders being interconnected to an annular actuating ring disposed in surrounding relationship with a cylindrical hub portion of said second pulley section, and antifriction bearing means fixedly supported on the annular hub portion of said second pulley section and drivingly engaged with said annular actuator ring.

11. A transmission assembly according to claim 1, wherein said bushing means includes a sleeve-like bushing member fixedly secured to said second pulley section and constructed of a self-lubricating plastic material, said bushing member being continuous and completely surrounding both said one shaft means and said key member for preventing relative sliding contact between said second pulley section and both said one shaft means and said key member.

References Cited

UNITED STATES PATENTS

| 2,846,894 | 8/1958 | Mas | 74—230.17 A |
| 3,280,649 | 10/1966 | Bruet | 74—230.17 F |
| 3,526,150 | 9/1970 | Iverson | 74—230.17 F |

LEONARD H. GERIN, Primary Examiner

U.S. Cl. X.R.

74—230.17 F